United States Patent [19]

te Hennepe et al.

[11] Patent Number: 4,925,562

[45] Date of Patent: May 15, 1990

[54] PERVAPORATION PROCESS AND MEMBRANE

[75] Inventors: Hendrikus J. D. te Hennepe, Enschede; Marcellinus H. V. Mulder, Enschede; Cornelis A. Smolders; Derk Bargeman, both of Hengelo; George A. T. Schröder, Voorschoten, all of Netherlands

[73] Assignee: GFT Gesellschaft fur Trenntechnik mbH, Homburg/Saar, Fed. Rep. of Germany

[21] Appl. No.: 76,733

[22] Filed: Jul. 23, 1987

[30] Foreign Application Priority Data

Jul. 29, 1986 [EP] European Pat. Off. ........ 86110455.2

[51] Int. Cl.⁵ .............................................. B01D 13/00
[52] U.S. Cl. .................................. 210/500.25; 210/640
[58] Field of Search .................... 55/16, 158; 210/640, 210/500.25

[56] References Cited

U.S. PATENT DOCUMENTS 4,311,594  1/1982  Perry .................................. 210/640
4,737,165  4/1988  Kulprathipanja et al. ............. 55/16

Primary Examiner—Frank Spear
Attorney, Agent, or Firm—Foley & Lardner, Schwartz, Jeffery, Schwaab, Mack, Blumenthal & Evans

[57] ABSTRACT

A prevaporation process characterized by excellent separation efficiency employs a membrane that comprises an elastomeric polymer matrix containing zeolite.

12 Claims, 1 Drawing Sheet

PERVAPORATION PROCESS AND MEMBRANE

BACKGROUND OF THE INVENTION

The present invention relates to a pervaporation process and to membranes useful in such a process.

Pervaporation is a separation process in which a liquid feed mixture to be separated into components is brought into contact with a first ("feed") side of a suitable membrane. If, at the second ("permeate") side of the membrane, the partial vapor pressures of the components of the liquid feed mixture are kept below the partial vapor pressures of the components at the feed side, a driving force is established for the migration of those components through the membrane. In this regard, the permeation rate ("permeability") of each component is a complex function of a number of different parameters, such as the nature and concentration of the permeating species, the nature and structure of the membrane, the composition of the mixture, temperature, and others.

Based on their respective permeabilities, the components will pass through the membranes at different rates. Since the partial vapor pressures are lower at the permeate side than at the feed side of the membrane, the components will evaporate after passing through the membrane and form a vaporous permeate, which is why the process is called "pervaporation." Due to the different permeabilities of the components, the composition of the permeate will differ from the composition of the feed mixture, and a separation of the feed mixture is observed.

So long as a sufficiently large difference in partial vapor pressures is maintained between the feed and permeate side, the separation capacity of a given membrane toward a given feed mixture is determined solely by the permeabilities of the respective components. Only nonporous membranes can be used for pervaporation, and it is believed that solubility of a component in the membrane material, together with diffusivities, govern mass transport across the membrane. Pervaporation is thus a nonequilibrium dynamic process, where transport phenomena determine separation efficiency.

The membrane-based process of pervaporation is generally known, and has been described in the literature, for instance, by M. H. V. Mulder et al., *J. Membr. Sci.* 16: 269 (1983), and by G. F. Tusel et al., *Desalination* 53: 327 (1985). Other pervaporation membranes are described by J. Neel et al., *Desalination* 53: 297 (1985), and by J.-P. Brun et al., *J. Membr. Sci.* 25: 55 (1985).

SUMMARY OF THE INVENTION

It is an object of the present invention to provide a new membrane that is useful in a pervaporation process characterized by good separation efficiency for various separation tasks.

It is also an object of the present invention to provide a pervaporation process with excellent separation efficiency.

It is another object of this invention to provide a continuous pervaporation process in which the feed material is passed continuously through an inlet chamber which is closed by a semipermeable membrane, and in which the permeate is continuously withdrawn from a permeate chamber located at the other side of this membrane, the process displaying improved efficiency over known processes.

It is yet another object of the present invention to provide a pervaporation process for industrial applications in which the removal of low concentrations of impurities, particularly organic impurities from water, constitutes a significant concern.

It is still another object of the present invention to provide a pervaporation apparatus that is particularly useful for the continuous separation of small, low-polarity organic molecules in admixture with a solvent of higher polarity.

In accomplishing the foregoing objects, there has been provided, in accordance with one aspect of the present invention, a membrane for the separation of small molecules from a fluid or a gas, comprising material (a) embedded in a polymer matrix (b) that is comprised of silicone rubber, wherein material (a) has molecular-sieve properties and comprises zeolite. In a preferred embodiment, the silicone rubber comprising the polymer matrix is a polysiloxane.

There has also been provided, in accordance with another aspect of the present invention, a process for separating a fluid admixture into components that differ in permeability with respect to a membrane, comprising the steps of (a) delivering the fluid admixture at a predetermined temperature to a first free surface of the membrane; and (b) effecting a reduction in pressure or temperature at a second free surface of the membrane, such that the components are separated across the membrane by pervaporation, wherein the membrane comprises material (a) embedded in a matrix (b) comprised of elastomeric polymer, material (a) having molecular-sieve properties and comprising zeolite. In one preferred embodiment, the elastomeric polymer comprises one or more of silicone rubber, and a nitrilebutadiene rubber, polyisobutylene, polyisoprene, and a styrene-/butadiene copolymer rubber.

In accordance with still another aspect of the present invention, apparatus has been provided for the separating a fluid admixture into components comprising:

(i) a membrane comprised of material (a) embedded in a matrix (b) that is comprised of elastomeric polymer, material (a) having molecular-sieve properties and comprising zeolite;

(ii) means for delivering the fluid admixture to a first free surface of the membrane; and (iii) means for effecting a reduction in pressure or temperature at a second free surface of the membrane, such that the components are separated across the membrane by pervaporation.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
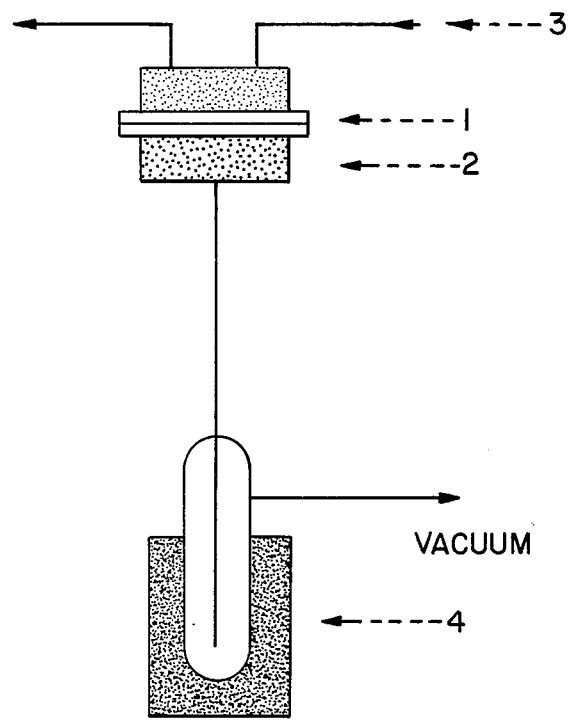
FIG. 1 is a schematic drawing that shows a pervaporation-apparatus design used in Example 1 and in Examples 2-6, respectively, as described below.

The polymer film employed in the membrane of the present invention is made from an elastomeric polymer.

In this context, the term "elastomeric" indicates that a suitable polymer for use according to the present invention can be stretched a significant amount and, after release of the stretching force, will return substantially to its original shape. A preferred group of such elastomeric polymers are the silicone rubbers, especially polysiloxane rubbers and in particular polydimethylsiloxane rubber; the nitrilebutadiene rubbers (NBR); polyisobutylene; polyisoprene; and styrenebutadiene copolymer rubbers.

A suitable elastomeric polymer for the membrane of the present invention preferably already exhibits a certain separation efficiency as a membrane, even without the zeolite incorporation therein. Preferred polymers of this sort can be broadly described as "hydrophobic," i.e., the polymers show a selectivity toward organic molecules over water. These preferred polymers thus allow molecules of significantly lower polarity than others to pass, while they reject molecules of higher polarity, such as water molecules.

Among silicone rubber polymers, polyhydrocarbyl siloxane is preferred. A polyhydrocarbyl siloxane is particularly preferred that has hydrocarbyl substituents with 1 to 10 carbon atoms, preferably aryl or alkyl substituents, which substituents may carry one or more fluorine substituents. Most preferably, these fluorine substituents, when present, are remote from the silicone atom, i.e., they are not on the carbon atom attached to the silicone atom.

Polydimethylsiloxane is particularly useful for some of the processes herein described and, hence, is a preferred constituent of the elastomeric polymer matrix in a membrane of the present invention.

In broad terms, the elastomeric polymers used in the membrane of the present invention have molecular weights in the range of 50,000 to 10 million.

In accordance with the present invention, zeolites are incorporated into the membrane, and are preferably are as hydrophobic as possible. These zeolites can also characterized as selectively sorbing organic molecules. The incorporation of the preferred, hydrophobic zeolites into the elastomeric polymer membrane of the present invention has been found to improve the performance of the membrane in such processes as the pervaporation process.

Some properties of crystalline aluminosilicates (zeolites) are described in U.S. Pat. No. 3,732,326 and European patent No. 31 676. Zeolites with a high Si/Al ratio exhibit hydrophobic behavior in that they sorb a less polar component from a mixture also including a more polar component. These zeolites are therefore preferred.

The preferred zeolites have a high Si/Al ratio, and more particularly have an Si/Al ratio of 12 or more and an $SiO_2/Al_2O_3$ ratio of 35 or more. These ratios can be determined by known processes, such as atomic absorption spectroscopy (AAS), X-ray spectroscopy and classical techniques, such as volumetric and titration methods.

The zeolites are finely divided materials when incorporated in the elastomeric polymer matrix. Generally, the particle size of the incorporated zeolite will be less than, and preferably significantly less than, the thickness of the membrane. The particle size of the zeolite is preferably 0.1 to 10 microns. One particularly advantageous zeolite material involves a mixture of two fractions, one having a particle size averaging about one micrometer and the larger fraction having a particle size average of about five micrometers. The particle size is determined by B.E.T. methods or X-ray diffraction.

Zeolites of this type can be produced in different ways. In general, zeolites can be treated to remove alumina from the framework so that the $SiO_2/Al_2O_3$ ratio is at least 35. On the other hand, zeolites can be synthesized in a form wherein said ratio is already at least 35. Such zeolites are especially useful for the present invention because they can be used without further treatment, and many zeolites of this nature are commercially available. One such preferred zeolite is silicalite, the preparation of which is disclosed in U.S. Pat. No. 4,061,724, the contents of which are hereby incorporated by reference. Three other suitable zeolites, ZSM-5, ZSM-11 and silicalite-2, are disclosed in U.S. Pat. Nos. 3,702,886 and 3,709,979, the respective contents of which are likewise incorporated by reference; these other zeolites are also described by D. M. Bibby et al., Nature 280: 664 (1979).

The preferred zeolites employed in accordance with the present invention can also be characterized by their ethanol-adsorption capacity. Preferably, this ethanol-adsorption capacity is in the range of 0.02 to 0.4 g/g, most preferably from 0.04 to 0.20 g/g. The adsorption-capacity values are measured using adsorption isotherms.

As indicated above, the membranes of the present invention preferably consist essentially of an elastomeric polymer and a zeolite. Conventional additives, such as stabilizers and the like, can also be included in the polymer.

The zeolite particles are embedded in the polymer matrix film, according to the present invention, in a quantity determined by stability considerations with respect to such film. Preferably, the film contains 10 to 80 weight-percent zeolite, most preferably 60 to 75 weight-percent, based on the total weight of the membrane, including the zeolite particles.

The thickness of the membrane typically is 1 to 200 micrometers, preferably about 5 to 20 micrometers.

The heterogenous membrane of the present invention can be shaped in various ways, and can be self-supporting or supported; it is preferred that the membrane be supported. In a self-supporting embodiment, the membrane is preferably formed as a hollow fiber.

The membranes of the present invention are selective toward molecules of low polarity in a mixture containing a material of high polarity. Since the membranes of the present invention exhibit both high flux and high selectivity, they can be used in various, membrane-based pervaporation separation processes. The membranes are particularly useful for a continuous process, although they can also be employed in batch operations, when desired.

In accordance with another embodiment of the present invention, a pervaporation process is provided that is characterized by the fact that a membrane as described above is used in the separation. The pervaporation separation process of the present invention can be broadly described as one in which a feed material containing at least two components having different permeability with respect to a membrane is passed into an inlet chamber and, thereby, into contact with that membrane. Due to the different permeabilities, the product passing through the membrane is enriched with the component having the higher permeability.

The product at the permeate side of the membrane is withdrawn in the form of a vapor. This is preferably accomplished by providing a condenser remote from the membrane, so that the vapor leaving the membrane on the permeate side condenses in this condenser. Thus, a preferred embodiment of a process within the present invention involves providing, on one side of the membrane, a feed material with at least two components of different permeability, and a permeate chamber on the other side of the membrane, with the proviso that the temperature of the permeate chamber is substantially below the temperature of the feed liquid on the other side of the membrane. It is most advantageous to effect continuous passing of the feed material through the feed chamber, which is closed by the membrane, and continuous withdrawal of the cold vapor from the permeate chamber. In any event, the membranes as described above are used as the active separation element.

The process of the present invention can be carried out under various pressures. For certain applications, it may be desirable to utilize substantially atmospheric pressure at the feed chamber, while in other cases a reduced pressure, or even a vacuum, may be applied to the permeate chamber. The temperatures and pressures actually employed depend upon the material to be separated, specifically upon the individual boiling points of the two components in the preferred process.

The most preferred way of carrying out the process of the present invention is in a multi-step, continuous operation whereby the individual materials are passed through a series of pervaporation cells, of which at least one contains, as the active material, the membrane of the present invention. In this way, a fractionation is achieved through a series of pervaporation cells. The number of such cells in a multi-step operation is preferably 2 to 10.

The permeate vapor can condense after it has been withdrawn from the permeate chamber and subjected to further treatment. The material depleted of the desired component can be recycled, e.g., to an initial separation column in which a predistillation of the material is carried out, from which the feed material is withdrawn. For instance, this feed material could be an azeotrope of the two components which are withdrawn from the initial distillation column.

A preferred field of application for the membrane according to the present invention, and a preferred process of this invention, is the continuous separation of small, low-polarity organic molecules in admixture with a solvent of higher polarity than said molecules. More specifically, the process of the present invention preferably involves the separation of small organic molecules from dilute aqueous solutions. Such organic molecules are particularly hydrocarbons; substituted hydrocarbons, especially chlorinated hydrocarbons; alcohols having from 1 to 5 carbon atoms in the alcohol molecule, such as methanol, ethanol, propanol, isopropanol, butanol and the like; and organic compounds of comparable polarity.

The present invention is thus particularly well-suited for the continuous removal of impurities, such as alcohols, from industrial and municipal waste waters. Another exemplary application of this invention is the removal of trace impurities from ground water. Still another application is the recovery of fermentation alcohol from the fermentation broth in a continuous membrane process.

In a preferred embodiment of the present invention, the concentration of the impurities to be removed, at least partially, by the above-described process ranges from 1 ppm to the solubility limits of the impurity. Typically these concentrations are in the range of 5 ppm to 5 percent by weight. For special purification purposes, the impurities of the feed stuffs used will be in the range of 20 to 10,000 ppm.

The pervaporation process of the present invention is particularly suitable for the separation of hydrocarbons and chlorinated hydrocarbons, alcohols, esters, ethers, and amines from aqueous solutions containing these impurities. The mentioned impurities typically have 1 to 12 carbon atoms. In the case of chlorinated hydrocarbons, the impurities will be present in a concentration of 5 mg organic chlorine per liter or less.

If this invention is used in conjunction with separating alcohols from aqueous solutions containing such alcohols, the concentrations of the alcohol will generally be less than 20 weight percent, and preferably less than 15 weight percent.

Further features and advantages will be apparent from the following example in connection with the drawing. These examples serve to illustrate, without limiting, the present invention. In Examples 2-6, the zeolite used was prepared according to U.S. Pat. No. 4,061,724. In each example, the zeolite was diffracted to determine that its structure corresponded to that of silicalite.

The apparatus in FIG. 1 comprises a membrane 1 supported by supporting means 2 and supplied with a feed solution 3. In the case of examples 1 to 6 described hereinafter, the feed solution is a dilute aqueous solution of an alcohol—namely, methanol, ethanol, propanol, isopropanol or butanol—from which the alcohol admixture has to be separated by a membrane pervaporation process. The amount of alcohol (i.e., of the small-organic-molecule compound) being transported through the membrane is vacuum frozen by means of a cooling trap 4 (e.g., a Dewar flask cooled with liquid nitrogen).

EXAMPLE 1

The preparation of polymer membranes, without zeolite added, and their pervaporation performance.

Silicone rubber formulations RTV 615A and 615B from the General Electric Corporation were mixed in a 10:1 ratio, according to the procedure described by General Electric. (The rubber present in this instance was polydimethylsiloxane.) The mixture was transferred past a doctor's knife and cast on a perspex plate, casting thickness 150 $\mu$m. In accordance with the procedure provided by General Electric, the perspex plate with the rubber film was put in an oven and the film was cured at 80° C. for four hours to assure complete crosslinking of the film.

After completion of the crosslinking, the resulting silicone rubber membrane was removed from the perspex plate. The thickness of the film was measured with help of a micrometer. Part of the membrane was put to the test on the pervaporation apparatus (see FIG. 1). The feed solution was a mixture of water and alcohol, the alcohol concentration being 5.3±0.2% by weight. The feed temperature was maintained at 22.5° C. The flux was determined by weighing of the collected permeate. All fluxes were normalized to 100 $\mu$m membrane thickness. The permeation selectivity was computed as $$\alpha = \frac{x_{alc}^{perm}}{x_{alc}^{feed}} = \frac{(1 - x_{alc}^{feed})}{(1 - x_{alc}^{perm})}$$

with x=weight fraction, and the superscripts "feed" and "perm" denoting feed solution and permeate, respectively. The subscript "alc" stands for alcohol.

Tested were the alcohols methanol, ethanol, propanol and isopropanol. The results are shown in Table 1.

TABLE 1 pervaporation results for silicone membranes; alcohol concentration of the feed 5.3 ± 0.2% by weight

| alcohol | flux (l/m²h) | α (—) |
|---|---|---|
| methanol | $2.0 \times 10^{-2}$ | 7.6 |
| ethanol | $2.4 \times 10^{-2}$ | 7.6 |
| propanol | $2.8 \times 10^{-2}$ | 19.1 |
| isopropanol | $2.7 \times 10^{-2}$ | 9.5 |

EXAMPLE 2

The preparation of a zeolite-containing silicone rubber membrane according to the present invention.

The particle size of the zeolite was determined, via scanning electron microscopy, to be between 0.5 and 10 μm. To avoid the unwanted presence of larger particles, the zeolite was sieved on a test sieve with a 40 μm aperture before further use. A silicone rubber mixture was prepared as in Example 1. An amount of 10 g of the prepared silicalite was mixed in a 25 ml jar with 4.4 g of the silicone rubber mixture. The resulting paste was transferred past a doctor's knife and cast on a perspex plate, casting thickness 150 mm. The zeolite-containing film, zeolite content 69.4% by weight, was cured as in Example 1. The membrane thickness was measured as in Example 1.

EXAMPLE 3

The dependence of membrane performance for a zeolite-filled membrane on the sorption capacity of the zeolite used.

Several batches of zeolite were prepared, according to U.S. Pat. No. 4,061,724, in batches of about 30 g. The different batches were characterized through ethanol adsorption at room temperature and surface area measurement (B.E.T. method). The ethanol adsorption was measured from the liquid phase through contacting about 1 g of zeolite with about 10 g of an ethanol/water mixture of about 10% by weight ethanol. The composition of the liquid was determined before and after adsorption was completed. The amount of ethanol adsorbed per gram of zeolite was computed from these data as $$M_{ads} = \frac{(x_{alc}^{before\ ads.} - x_{alc}^{after\ ads.}) \times M_{mix}}{M_{sil}} \text{ (g/g)}$$

where $M_{mix}$ is the mass of the liquid in contact with the zeolite and $M_{sil}$ is the mass of the zeolite.

Due to scattering in the synthesis results, some batches with different $M_{ads}$ were obtained. To obtain pervaporation data for each batch of zeolite, membranes were made from the different batches according to the method in Example 2, but with a 60%-by-weight filling. The membranes were tested as in Example 1, the alcohol being ethanol. In Table 2 the sorption and pervaporation data are listed for three different zeolite batches.

TABLE 2

Adsorption and pervaporation data; alcohol (ethanol) concentration of the feed 5.3 ± 0.2% by weight.

| silicalite | surface area (m²/g) | $M_{ads}$ (g/g) | flux (l/m²h) | α (—) |
|---|---|---|---|---|
| A | 150 | 0.04 | $1.8 \times 10^{-2}$ | 8.4 |
| B | 300 | 0.10 | $5.5 \times 10^{-2}$ | 17 |
| C | 394 | 0.13 | $2.7 \times 10^{-2}$ | 24 |

EXAMPLE 4

The influence of the zeolite content on membrane performance for various alcohols.

The zeolite was characterized by ethanol adsorption as in Example 3. Batches with an adsorption capacity of 0.10±0.01 g/g were selected. Membranes were made as in Example 2, but with different zeolite contents. These membranes were tested, as in Example 1, to obtain the pervaporation data collected in Table 3.

TABLE 3

Pervaporation data for membranes with different zeolite content; alcohol concentration of the feed 5.3 ± 0.2% by weight

| alcohol | silicalite (% by weight) | flux (l/m²h) | α (—) |
|---|---|---|---|
| methanol | 30 | $3.5 \times 10^{-2}$ | 9.5 |
|  | 60 | $7.8 \times 10^{-2}$ | 13.0 |
| ethanol | 20 | $2.9 \times 10^{-2}$ | 10.3 |
|  | 40 | $3.6 \times 10^{-2}$ | 14.9 |
|  | 60 | $5.5 \times 10^{-2}$ | 17.2 |
| propanol | 30 | $2.9 \times 10^{-2}$ | 21.2 |
|  | 45 | $3.1 \times 10^{-2}$ | 25.4 |
|  | 60 | $3.1 \times 10^{-2}$ | 38.3 |
|  | 70 | $3.5 \times 10^{-2}$ | 49.3 |
| isopropanol | 30 | $2.9 \times 10^{-2}$ | 11.9 |
|  | 45 | $3.2 \times 10^{-2}$ | 13.7 |
|  | 60 | $3.8 \times 10^{-2}$ | 23.0 |

EXAMPLE 5

The flux and selectivity of a zeolite-containing silicone rubber membrane for butanol.

The zeolite was characterized through ethanol adsorption as in Example 3, the sorption capacity being 0.10±0.01 g/g. A membrane was made as in Example 2, but with a filling of 70% by weight. The membrane performance was tested as in Example 1, but the alcohol used was butanol. The feed solution contained 2.87% by weight butanol and the temperature of the feed was 21° C.

The pervaporation result for butanol was:

| flux | $2.75 \times 10^{-2}$ | (l/m²h) |
|---|---|---|
| α | 135 | (—) |

EXAMPLE 6

The influence of temperature on pervaporation performance for various alcohols.

Adsorption capacity of the zeolite for ethanol was measured as in Example 3. Batches with a sorption capacity of 0.10±0.01 g/g were selected, and membranes were made as in Example 2 but with 60% by weight zeolite content. The membranes were tested as in Example 1, but the temperature of the feed was raised to 35° C. for methanol. For ethanol and propanol, the temperature was raised to 35° C. and to 50° C.

The results are listed in Table 4, together S with reference data for T=22.5° C. from Table 3.

TABLE 4

Influence of temperature on pervaporation performance alcohol concentration of the feed 5.3 ± 0.2% by weight.

| alcohol | T (°C.) | flux (l/m²h) | α (—) |
|---|---|---|---|
| methanol | 22.5 | $7.8 \times 10^{-2}$ | 13.0 |
|  | 35.0 | $15.5 \times 10^{-2}$ | 9.5 |
| ethanol | 22.5 | $5.5 \times 10^{-2}$ | 17.2 |
|  | 35.0 | $14.0 \times 10^{-2}$ | 14.0 |
|  | 50.0 | $18.2 \times 10^{-2}$ | 12.1 |
| propanol | 22.5 | $3.1 \times 10^{-2}$ | 38.3 |
|  | 35.0 | $7.1 \times 10^{-2}$ | 38.8 |
|  | 50.0 | $18.1 \times 10^{-2}$ | 35.5 |

What is claimed is:

1. A pervaporation membrane for the separation of small molecules from a fluid or a gas, comprising material (a) embedded in a polymer matrix (b) that is comprised of silicone rubber, wherein said material (a) has molecular-sieve properties and comprises zeolite characterized by an Si:Al atomic ratio of at least 12 or an $SiO_2:Al_2O_3$ ratio of at least 35.

2. The membrane of claim 1, wherein said zeolite has an ethanol absorption capacity in the range of about 0.04 to 0.20 g/g.

3. The membrane of claim 1, wherein said zeolite is present in an amount of at least 10% by weight.

4. The membrane of claim 3, wherein said zeolite is present in an amount in the range from 10% to 90% by weight.

5. The membrane of claim 3, wherein said zeolite is present in an amount in the range from 50% to 70% by weight.

6. The membrane of claim 1, wherein said zeolite has a particle size of less than 40 μm.

7. The membrane of claim 6, wherein said particle size is in the range from 0.5 to 10 μm.

8. The membrane of claim 1, wherein said membrane has a thickness in the range from 50 to 500 μm.

9. The membrane of claim 8, wherein said thickness is in the range from 100 to 200 μm.

10. The membrane of claim 1, wherein said silicone rubber is a polysiloxane.

11. The membrane of claim 10, wherein said polysiloxane is a polyhydrocarbyl siloxane.

12. The membrane of claim 10, wherein said polysiloxane is polydimethylsiloxane.

* * * * *